(12) United States Patent
Islam (10) Patent No.: US 10,910,763 B2
(45) Date of Patent: Feb. 2, 2021

(54) ASSEMBLY FOR CONNECTING CONNECTOR WITH CONDUIT

(71) Applicant: CommScope Technologies LLC, Hickory, NC (US)

(72) Inventor: Nahid Islam, Westmont, IL (US)

( * ) Notice: Subject to any disclaimer, the term of this patent is extended or adjusted under 35 U.S.C. 154(b) by 0 days.

(21) Appl. No.: 16/437,330

(22) Filed: Jun. 11, 2019

(65) Prior Publication Data

US 2019/0386427 A1 Dec. 19, 2019

Related U.S. Application Data

(60) Provisional application No. 62/686,886, filed on Jun. 19, 2018.

(51) Int. Cl.
| | |
|---|---|
| *H01R 13/623* | (2006.01) |
| *G02B 6/38* | (2006.01) |
| *G02B 6/44* | (2006.01) |
| *H01R 4/72* | (2006.01) |

(52) U.S. Cl.
CPC ......... *H01R 13/623* (2013.01); *G02B 6/3887* (2013.01); *H01R 4/72* (2013.01); *G02B 6/4416* (2013.01)

(58) Field of Classification Search
CPC .. G02B 6/3879; G02B 6/3891; G02B 6/3894; G02B 6/4435; H01R 13/623
See application file for complete search history.

(56) References Cited

U.S. PATENT DOCUMENTS

| 5,170,452 | A | * | 12/1992 | Ott | G02B 6/3847 385/56 |
| 5,217,393 | A | * | 6/1993 | Del Negro | H01R 9/0518 439/585 |
| 5,888,097 | A | * | 3/1999 | DiCicco | H01R 9/032 439/589 |
| 7,431,614 | B2 | * | 10/2008 | Eriksen | H01R 13/5825 439/578 |
| 7,572,063 | B2 | * | 8/2009 | Mynott | G02B 6/3817 385/56 |
| 7,575,459 | B2 | * | 8/2009 | Nickol | H01R 13/622 439/253 |
| 7,722,259 | B2 | * | 5/2010 | Smith, III | G02B 6/3817 385/53 |

(Continued)

FOREIGN PATENT DOCUMENTS

WO 2014/189567 11/2014

OTHER PUBLICATIONS

International Search Report and Written Opinion corresponding to International Application No. PCT/US2019/036312 dated Oct. 2, 2019.

*Primary Examiner* — Rhonda S Peace
(74) *Attorney, Agent, or Firm* — Myers Bigel, P.A.

(57) ABSTRACT

A cable-connector assembly includes: a cable including signal-carrying members, the signal-carrying members being circumferentially surrounded by a conduit; a connector configured to mate with a mating connector, the signal carrying members being connected with ports on the connector; and a generally cylindrical housing that circumferentially surrounds the signal-carrying members, the housing including a narrow neck that fits within an end of the conduit and a wide main portion that engages the connector.

7 Claims, 12 Drawing Sheets

(56) References Cited

U.S. PATENT DOCUMENTS

| | | | |
|---|---|---|---|
| 8,450,610 B2* | 5/2013 | Alvelo | H01B 7/18 |
| | | | 174/84 R |
| 9,057,845 B2* | 6/2015 | Szilagyi | B29D 11/0075 |
| 9,256,030 B2* | 2/2016 | Belenkiy | G02B 6/36 |
| 9,437,965 B2* | 9/2016 | Zitsch | H01R 13/62 |
| 9,742,176 B2 | 8/2017 | Wang | |
| 10,297,960 B2* | 5/2019 | Urtz, Jr. | H01R 24/542 |
| 2003/0007739 A1* | 1/2003 | Perry | G02B 6/264 |
| | | | 385/60 |
| 2003/0091383 A1* | 5/2003 | Conway | H01R 13/622 |
| | | | 403/348 |
| 2003/0148652 A1* | 8/2003 | Bernardi | G02B 6/3879 |
| | | | 439/462 |
| 2013/0209041 A1 | 8/2013 | Szilagyi et al. | |
| 2015/0177467 A1* | 6/2015 | Gniadek | G02B 6/3891 |
| | | | 385/58 |
| 2015/0241639 A1 | 8/2015 | Lu et al. | |
| 2017/0018871 A1 | 1/2017 | Vaccaro | |
| 2018/0052293 A1 | 2/2018 | Mullaney et al. | |
| 2019/0386427 A1* | 12/2019 | Islam | H01R 13/623 |

* cited by examiner

ASSEMBLY FOR CONNECTING CONNECTOR WITH CONDUIT

RELATED APPLICATION

The present application claims priority from and the benefit of U.S. Provisional Patent Application No. 62/686,886, filed Jun. 19, 2018, the disclosure of which is hereby incorporated herein in its entirety.

FIELD OF THE INVENTION

The present invention relates generally to power and signal distribution, and more particularly to distribution from hybrid cables.

BACKGROUND

Latest developments in technology for delivering power and data in wireless infrastructure use hybrid cables wherein the term "hybrid cable" is intended to mean a cable that includes both power conductors and one or more fiber optic cords or cables. An exemplary hybrid cable is the HFF cable, available from CommScope, Inc. (Joliet, Ill.) Unlike RF-based systems, a single hybrid trunk cable can be used to power multiple sectors, thereby eliminating multiple runs of RF cable.

Typical hybrid cables are surrounded by an external jacket, typically formed of a polymeric material. However, in some instances hybrid cables are surrounded by conduit, which can provide greater protection to the conductors and optical fibers inside. Such conduit may be metallic, or have a metallic layer (e.g., braided or shielded) with a polymeric jacket. Attachment of a terminating connector to a cable with conduit raises additional issues that may require new designs.

SUMMARY

As a first aspect, embodiments of the invention are directed to a cable-connector assembly comprising: a cable including signal-carrying members, the signal-carrying members being circumferentially surrounded by a conduit; a connector configured to mate with a mating connector, the signal carrying members being connected with ports on the connector; and a generally cylindrical housing that circumferentially surrounds the signal-carrying members, the housing including a narrow neck that fits within an end of the conduit and a wide main portion that engages the connector.

As a second aspect, embodiments of the invention are directed to a cable-connector assembly comprising: a cable including signal-carrying members, the signal-carrying members being circumferentially surrounded by a conduit; a connector configured to mate with a mating connector, the signal carrying members being connected with ports on the connector; a generally cylindrical housing that circumferentially surrounds the signal-carrying members and engages the connector; and a conduit fitting that engages an end of the conduit and the housing.

DETAILED DESCRIPTION

The present invention will now be described more fully hereinafter, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees or at other orientations) and the spatially relative descriptors used herein interpreted accordingly.

Well-known functions or constructions may not be described in detail for brevity and/or clarity.

Figures 1, 2:
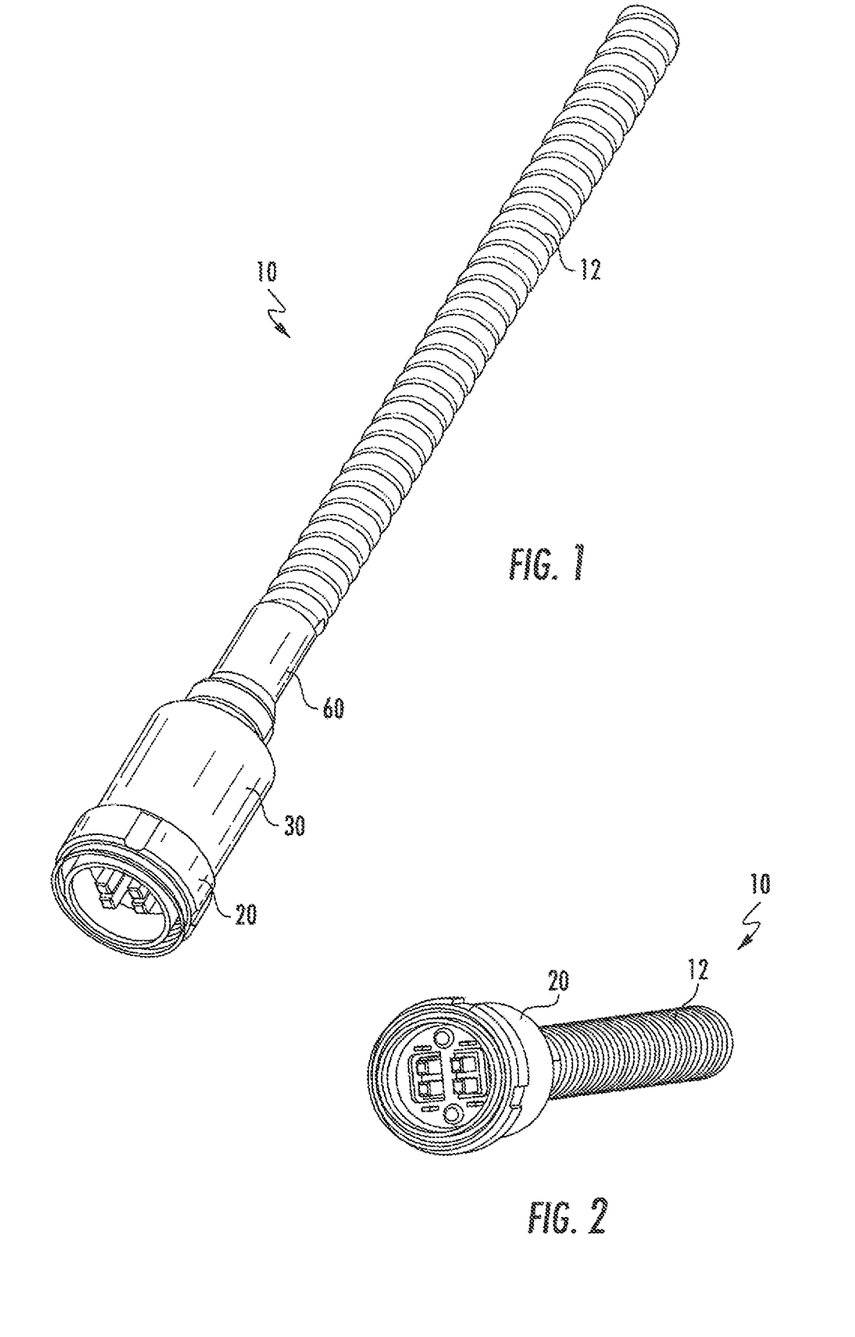
FIG. 1 is a top perspective view of a hybrid cable-connector assembly according to embodiments of the invention.
FIG. 2 is a front perspective view of the assembly of FIG. 1.
Figure 3:
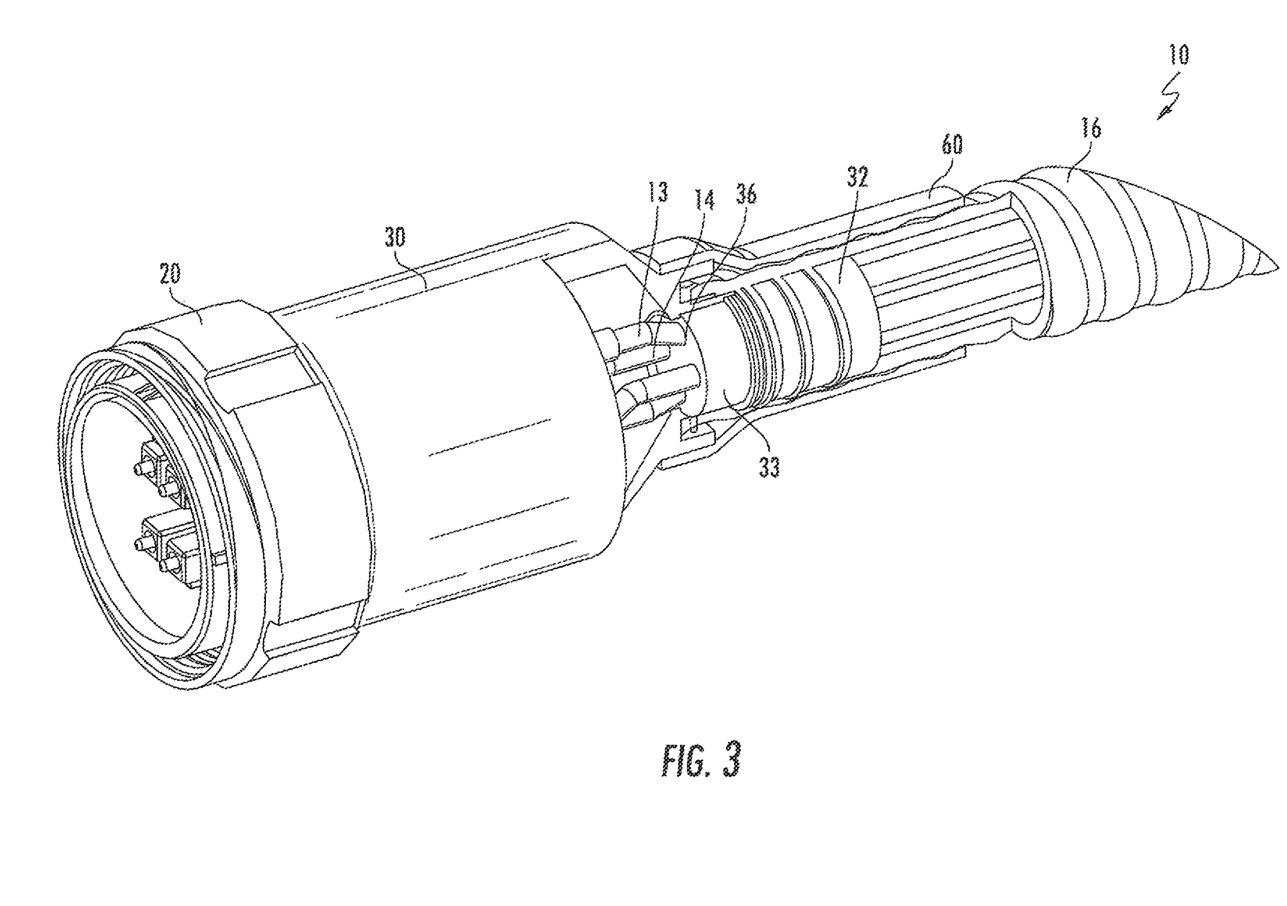
FIG. 3 is an enlarged, partial section, perspective view of the assembly of FIG. 1.
Figure 4:
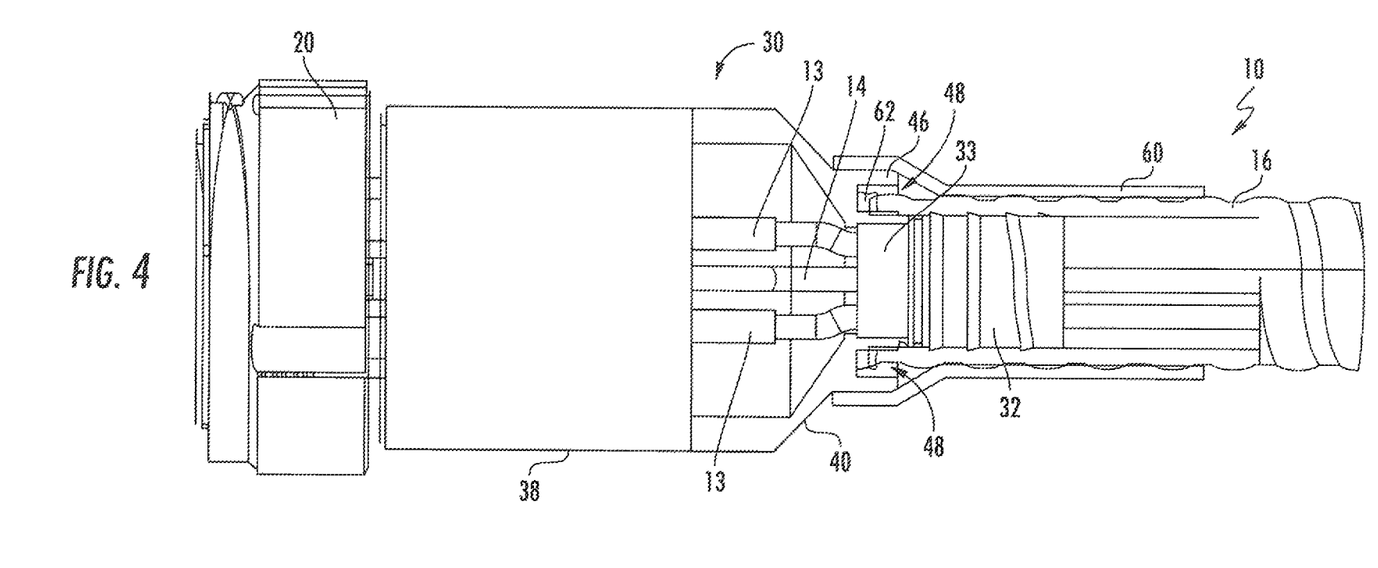
FIG. 4 is a side partial section view of the assembly of FIG. 1.

Referring now to the drawings, a cable-connector assembly, designated broadly at 10, is shown in FIGS. 1-11. The assembly includes a hybrid cable 12 with optical fibers 13 and conductors 14 (FIGS. 3 and 4). A conduit 16 surrounds the optical fibers 13 and conductors 14. The cable 12 is terminated with a hybrid connector 20 that has ports 22, 24 for mating with optical fibers and conductors, respectively via a mating connector (not shown).

Referring now to FIGS. 3-7, the specifics of the joint between the cable 12 and the connector 20 are shown therein. A generally cylindrical housing 30 has a neck 32 with external threads 34. (which include a helical segment 34a and annular threads 34b). A plug 33 is positioned within the neck 32 and includes holes 36 that enable the routing of conductors and optical fibers. A wider main portion 38 of the housing 30 is attached to the neck 32 via a sloped transition 40. At its open end, the main portion 38 includes internal threads 42 and an O-ring 44 located just internal of the threads 42. Adjacent the neck 32, a lip 46 extends from the transition 40 toward the cable 12. The inner surface of the lip 46 and the outer surface of the neck 32 form a gap 48.

At the end of the housing 30 opposite the neck 32, the connector 20 is attached to the main portion 38 of the housing 30. The connector 20 may be any connector that enables the interconnection of optical fibers 13 and conductors 14 with mating fibers and conductors. The connector 20 has threads (not shown) that engage the internal threads 42 of the housing. The O-ring 44 provides a seal between the inner surface of the housing 30 and the connector 20.

Figure 5:
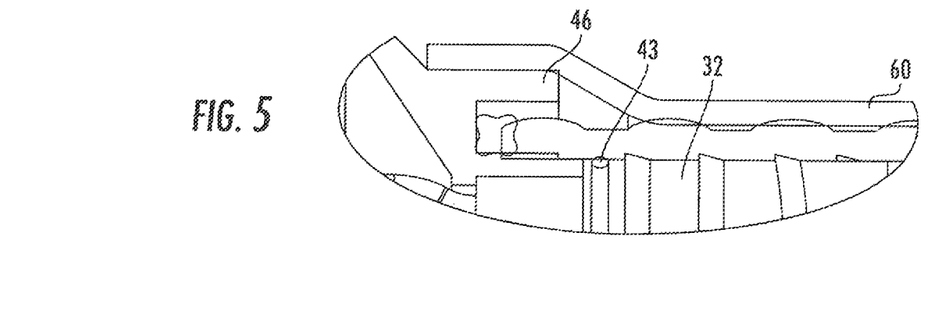
FIG. 5 is a greatly enlarged partial section view of the assembly of FIG. 1.

As seen in FIGS. 3-5, the free end of the conduit 16 is received in the gap 48 between the lip 46 and the neck 32 of the housing 30. An O-ring 62 (in this instance having a generally square cross-section is positioned at the base of the gap 48 and provides a seal between the end of the conduit 16 and the housing 30. An additional O-ring 43 is positioned near the open end of the gap 48 and beneath the free end of the conduit 16 to provide an additional seal (FIG. 5). A heat shrink tube 60 overlies, the end of the conduit 16, the neck 32 and the lip 46, thereby encapsulating these structures. The heat shrink tube 60 may be any known to those skilled in this art.

In the illustrated embodiment, the neck 32 is received within the conduit 16 as an interference fit. The external threads 34, and in particular the helical segment 34a, can assist with the process of interconnecting the housing 30 with the conduit 16; rotation of the housing 30 relative to the conduit 16 advances the neck 32 of the housing 30 into the conduit 16, with the helical nature of the conduit 16 assisting advancement. The optical fibers 13 and conductors 14 are routed through the plug 33 and into the cavity of the housing 30, where they are connected with appropriate mounting points on the connector 20.

Figure 6:
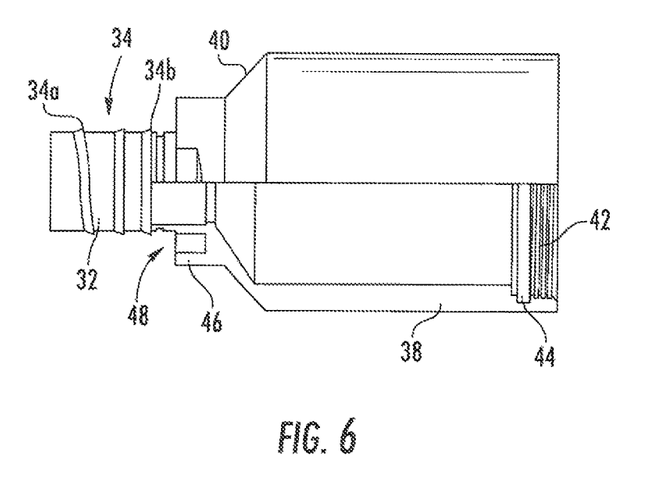
FIG. 6 is a side partial section view of the housing of the assembly of FIG. 1.
Figure 7:
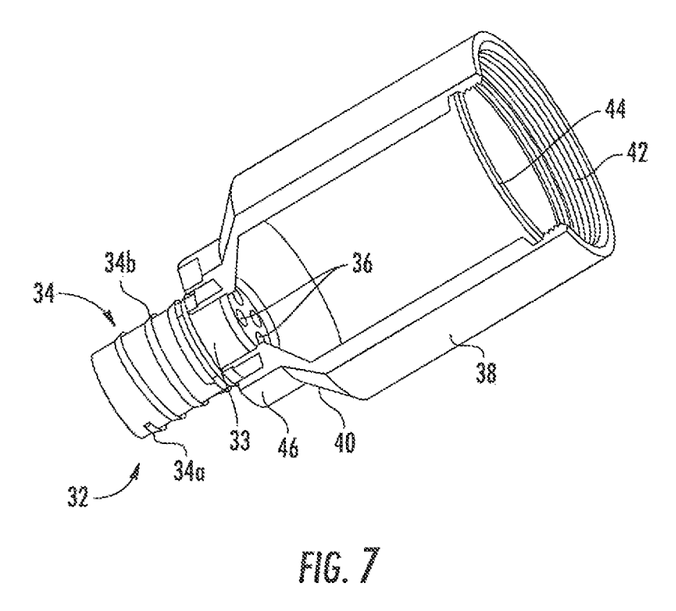
FIG. 7 is a perspective section view of the housing of FIG. 6.
Figure 8:
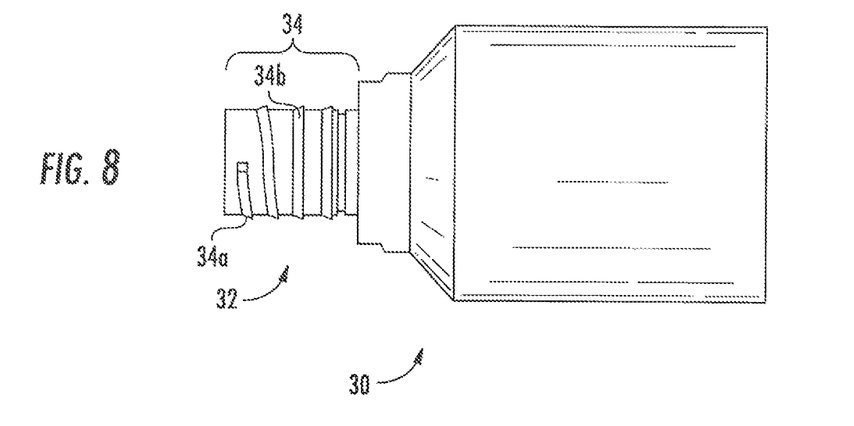
FIG. 8 is a side perspective view of the housing of FIG. 6.
Figure 9:
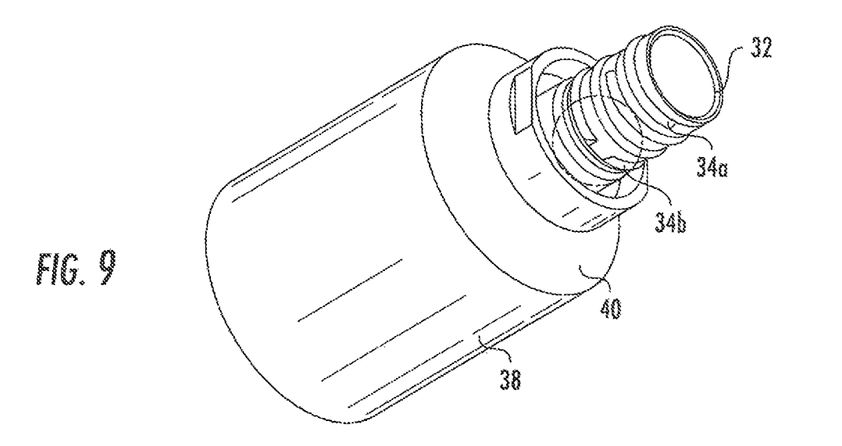
FIG. 9 is a rear perspective view of the housing of FIG. 6.
Figure 10:
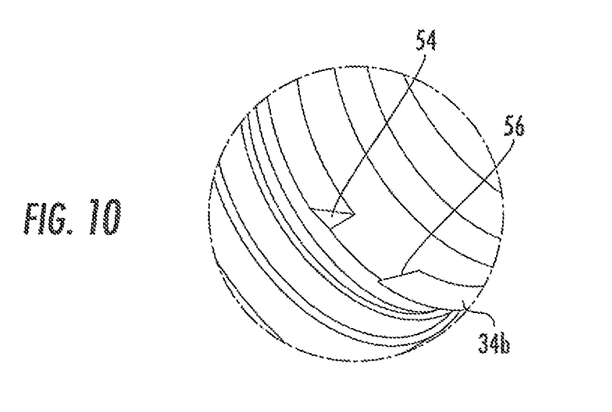
FIG. 10 is a greatly enlarged perspective view of the threads of the lousing of FIG. 6.

As shown in FIG. 10, one of the annular threads 34b may include gap 52 with a chamfered end 54 and a reverse chamfered end 56; these can encourage rotation of the housing 30 relative to the conduit 16 during installation (e.g., during clockwise rotation), but discourage rotation to dissemble the components (e.g., for counterclockwise rotation). Also, as can be seen in FIGS. 6 and 8, the helical segment 34a of the threads 34 may be barbed to assist with installation, and the annular threads 34b may have a radial barb to assist with retention.

Figure 11:
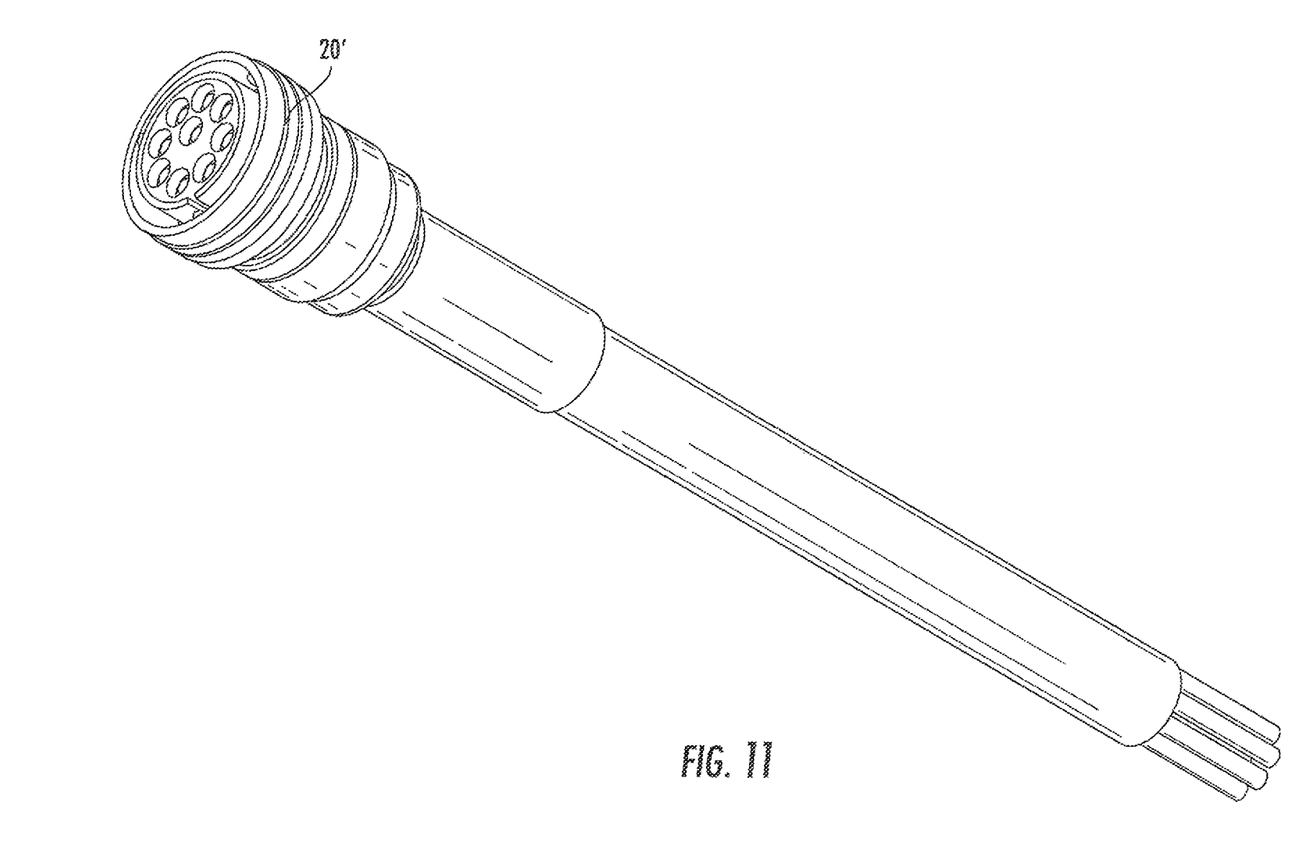
FIG. 11 is a top perspective view of a hybrid cable-connector assembly according to additional embodiments of the invention.
Figure 12:
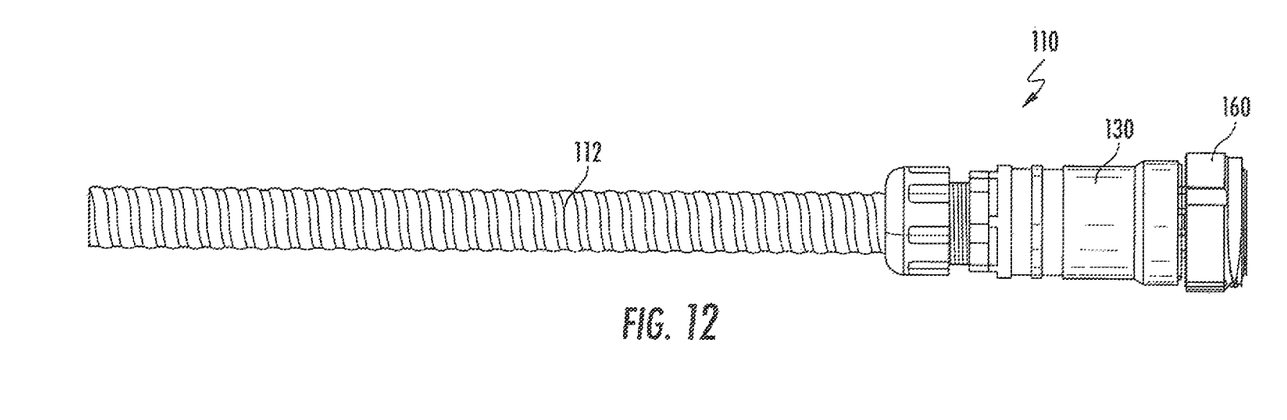
FIG. 12 is a side view of a hybrid cable-connector assembly according to further embodiments of the invention.
Figure 13:
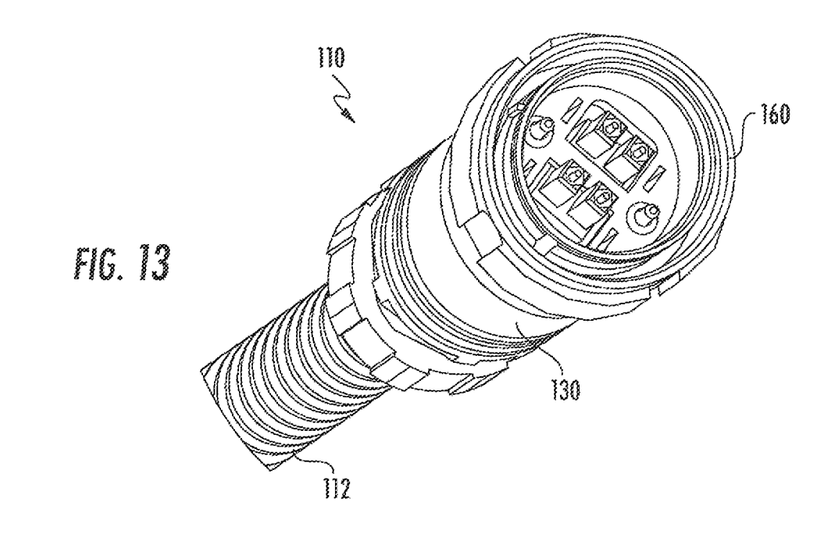
FIG. 13 is an enlarged front perspective view of the assembly of FIG. 12.
Figure 14:
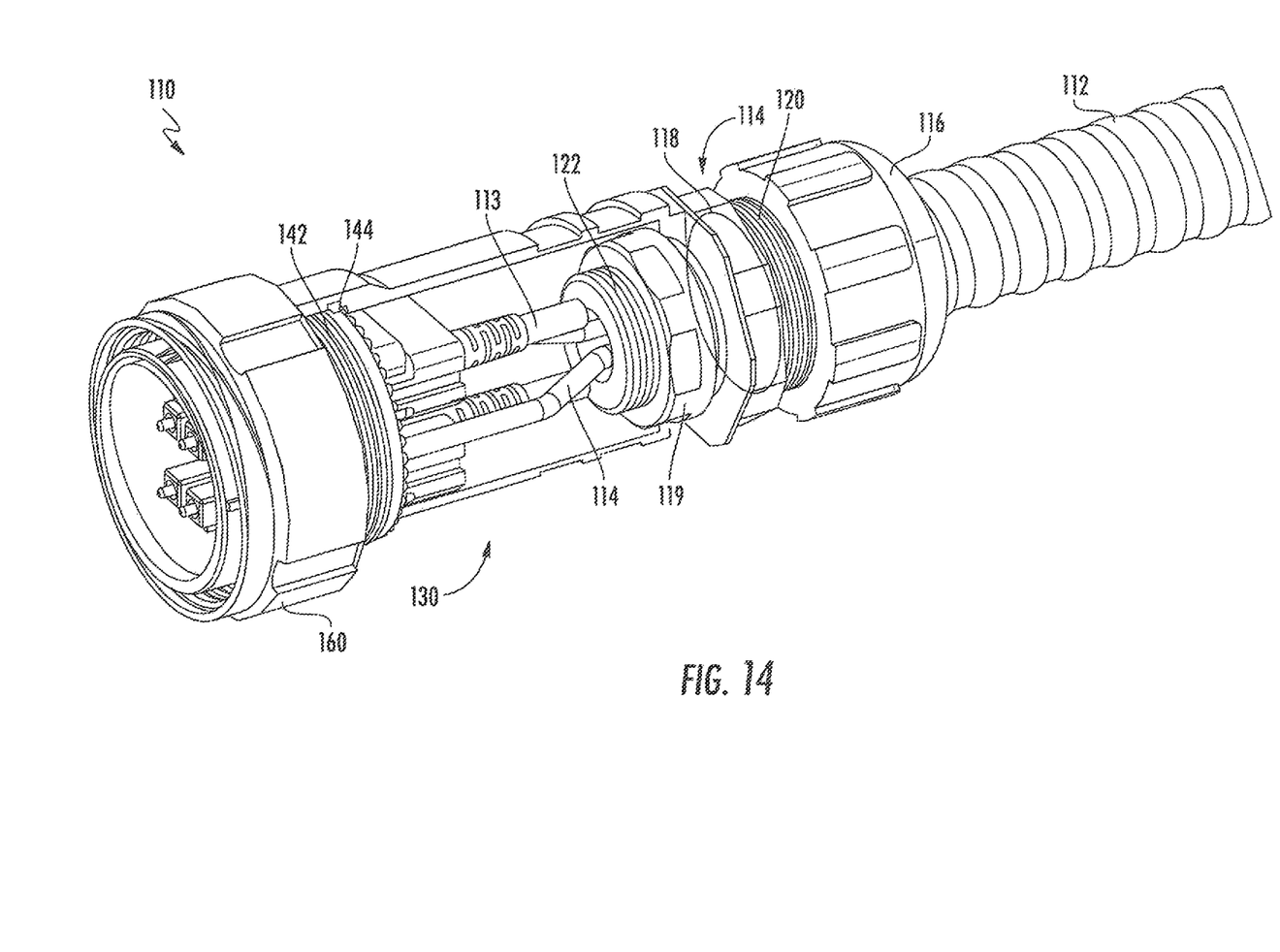
FIG. 14 is an enlarged, partial section, perspective view of the assembly of FIG. 12.
Figure 15:
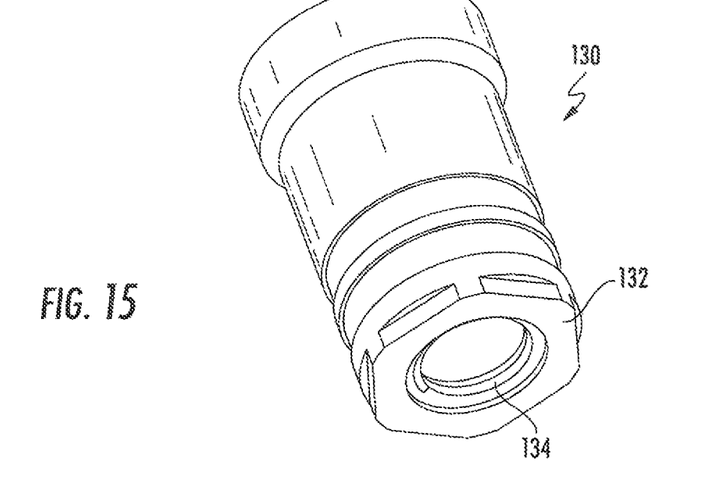
FIG. 15 is a rear perspective view of the housing of the assembly of FIG. 12.
Figure 16:
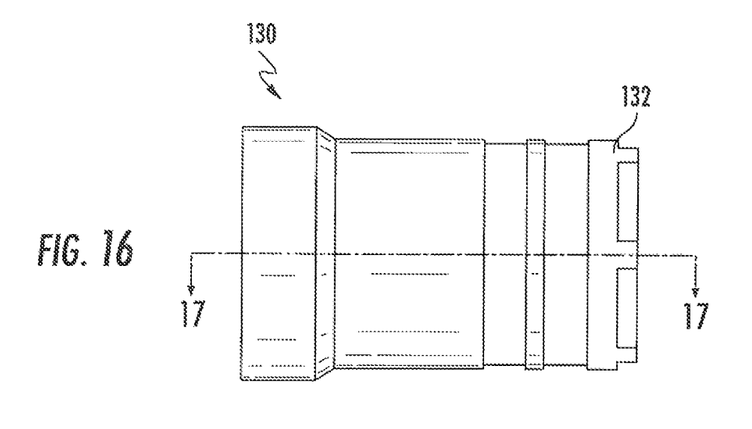
FIG. 16 is a side view of the housing of FIG. 15.
Figure 17:
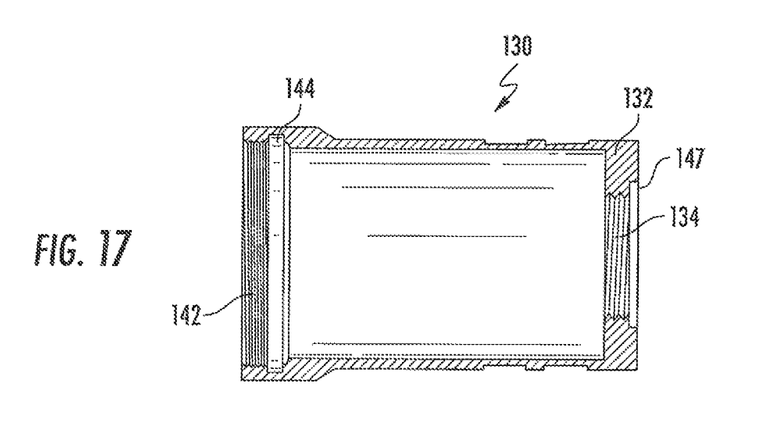
FIG. 17 is a side section view of the housing of FIG. 15.

Those of skill in this art will appreciate that other varieties of connectors may be used herein (note in FIG. 11 a different style of hybrid connector 20' is used). Further, the housing and heat shrink tube may be employed with cables/connectors that are fully populated with conductors or optical fibers rather than with both. Moreover, the housing and heat shrink tube may be employed with component other than connectors, such as a pendant-style breakout enclosure like that discussed in U.S. Pat. No. 9,742,176 to Wang, the disclosure of which is hereby incorporated herein by reference in its entirety.

Referring now to FIGS. 12-20, another assembly according to embodiments of the invention is illustrated therein and designated broadly at 110. The assembly 110 includes a cable 112 of the type described above, but the cable 112 has a conventional conduit fitting assembly 114 with back nut 116 and a double-threaded fitting 118 having threads 120, 122. The threads 120 mesh with the back nut 116 to secure the fitting assembly 114 to the cable 112. A nut 119 is also included that mates with the threads 122.

Referring to FIGS. 14-17, a housing 130 is generally cylindrical and hollow. At one end, the housing 130 has a hexagonal profile 132. Radially inwardly from the hexagonal profile 132 are internal threads 134. The threads 134 mesh with threads 122 of the fitting 118. At the opposite end, the housing 130 includes internal threads 142 and an O-ring 144 located just internal of the threads 142.

Figure 18:
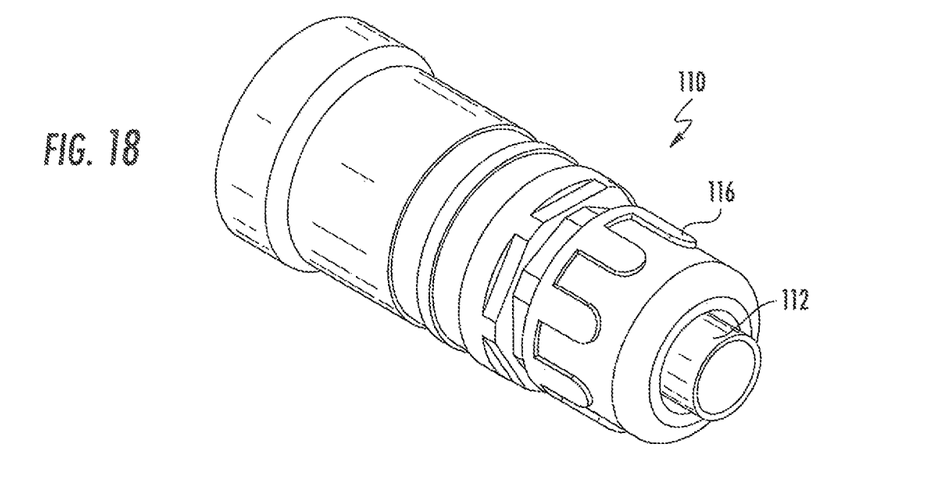
FIG. 18 is a rear perspective view of the housing of FIG. 15 with the securing nut attached.
Figure 19:
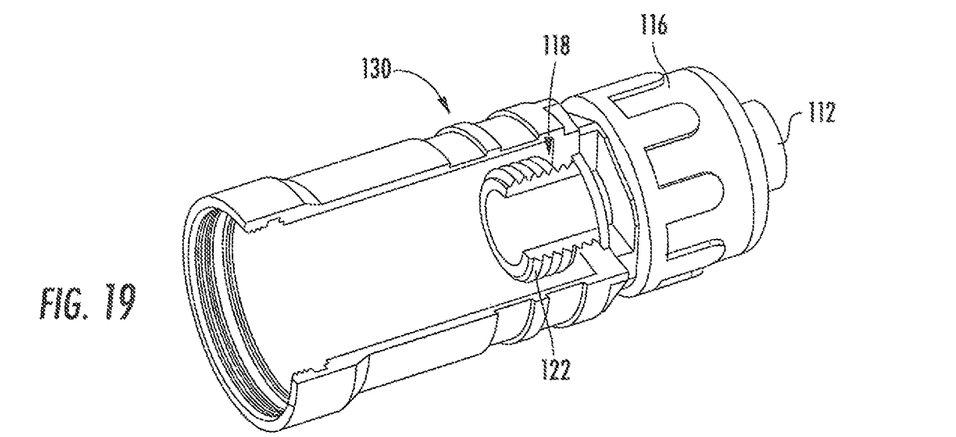
FIG. 19 is a front perspective, partial section view of the housing and securing nut of FIG. 18.
Figure 20:
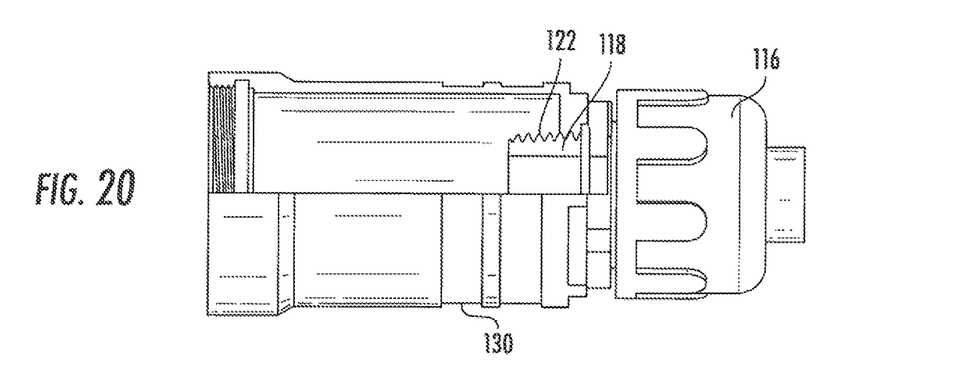
FIG. 20 is a side, partial section view of the housing and securing nut of FIG. 18.

As can be seen in FIGS. 18-20, the assembly 110 can be assembled by first threading the hack nut 116 onto the end of the cable 112. The fitting 118 is inserted into the sealing nut 116, with the threads 120 engaging internal threads of the back nut 116. The optical fibers 113 and conductors 114 are routed through the fitting 118. The housing 130 is then threaded onto the threads 122 of the fitting 118, and the nut 119 is also threaded onto the threads 122 to secure the housing 130 in, place. The optical fibers 113, 114 are connected with the connector 160, which is then attached to the housing 130 via the threads 142. Sealing of the interface is provided by the O-ring 144 and another O-ring (not shown) located in a groove 147 on the housing 130 (see FIG. 17).

Figure 21:
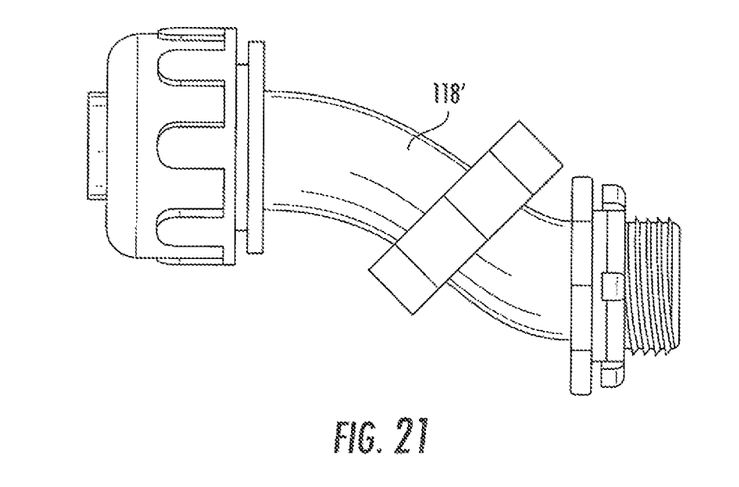
FIG. 21 is a side view of an alternative conduit fitting with a bend along its length.
Figure 22:
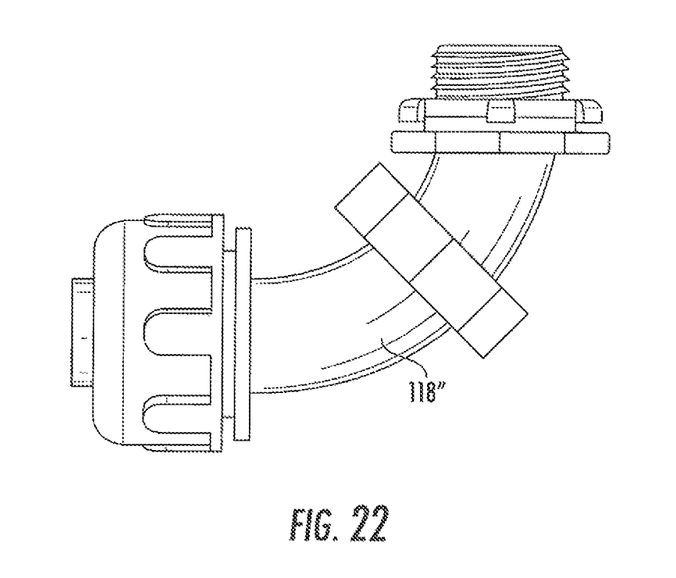
FIG. 22 is a side view of another alternative conduit fitting with a 90 degree bend.
Figure 23:
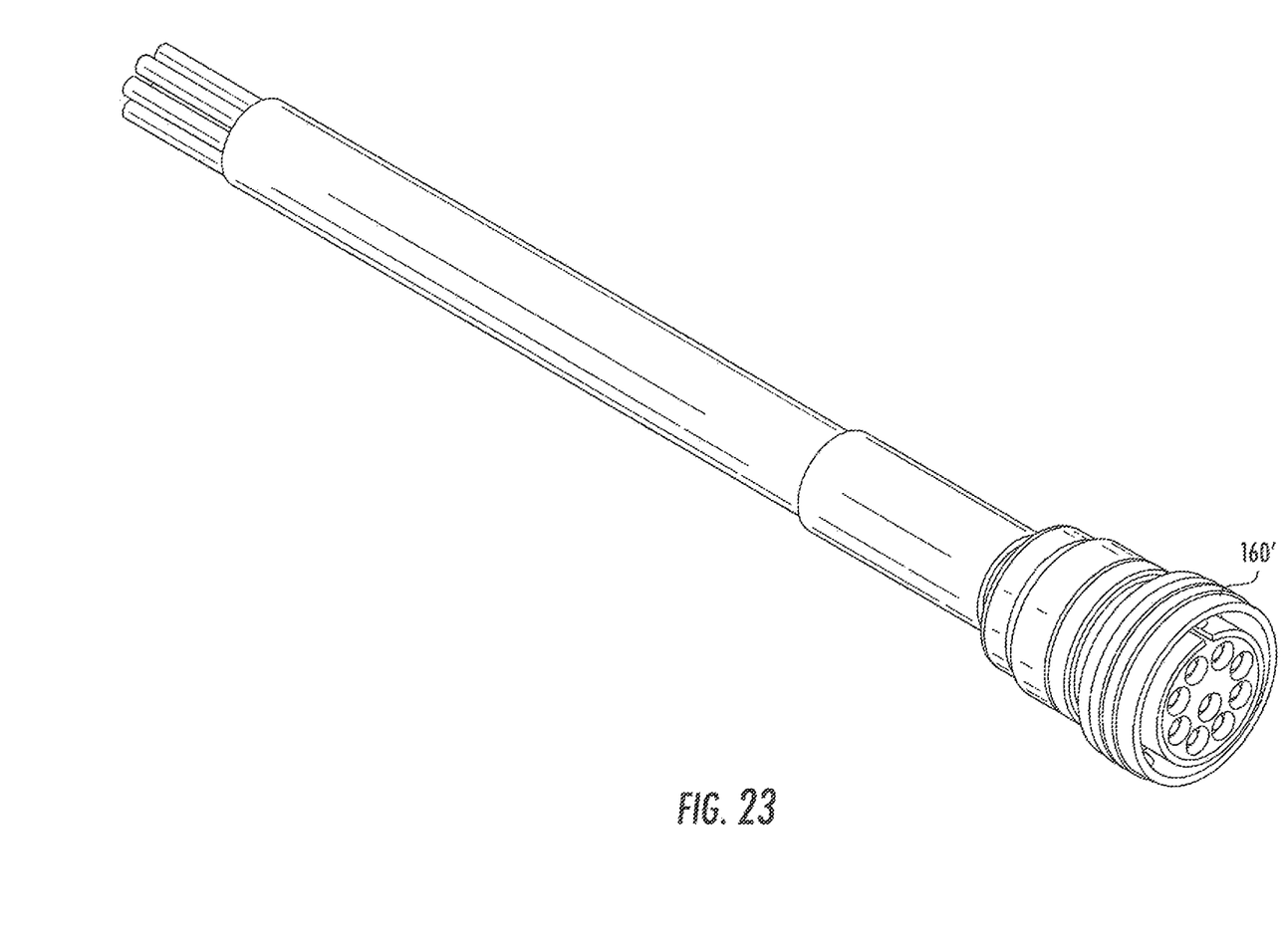
FIG. 23 is a perspective view of an assembly according to still further embodiments of the invention.

Those skilled in this art will appreciate that embodiments of the invention may take other forms. For example, the fitting 118 may be replaced with a fitting having a bend along its length (shown at 118' in FIG. 21) or a fitting having a 90 degree bend (shown at 118" in FIG. 22). As discussed above, the connector 160 may be replaced with a connector of a different style as shown at 160' in FIG. 23.

In some embodiments, the fittings may include a metallic portion that electrically connects the conduit to a contact pin of the connector for grounding purposes.

Those of skill in this art will also appreciate that, although a hybrid cable and a hybrid connector are shown herein, the concepts discussed herein may be equally applicable to fiber optic conduit or power conduit. They may also be applicable to other types of cable, such as "loose tube" cable, and in particular cables with helical protrusions/corrugations similar to that illustrated by the conduit discussed above.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable-connector assembly, comprising:
    a cable including signal-carrying members, the signal-carrying members being circumferentially surrounded by a conduit;
    a connector configured to mate with a mating connector, the signal carrying members being connected with ports on the connector;
    a generally cylindrical housing that circumferentially surrounds the signal-carrying members and engages the connector; and
    a conduit fitting that engages an end of the conduit and the housing the conduit fitting including external threads that are positioned radially inward of the housing.

2. The assembly defined in claim 1, further comprising a back nut that engages threads on the conduit fitting to compress the fitting onto the conduit.

3. The assembly defined in claim 1, wherein the housing includes threads that mesh with the external threads of the fitting.

4. The assembly defined in claim 3, further comprising a securing nut that engages the external threads of the fitting and secures the housing to the fitting.

5. The assembly defined in claim 1, wherein the housing is threadedly attached to the connector.

6. The assembly defined in claim 1, wherein the signal-carrying members comprise optical fibers and electrical conductors.

7. The assembly defined in claim 1, wherein the conduit includes a helical outer surface.

* * * * *